United States Patent
Boyer et al.

(10) Patent No.: US 8,572,751 B2
(45) Date of Patent: Oct. 29, 2013

(54) METHOD, SYSTEM, AND PROGRAM PRODUCT FOR PREVENTING UNAUTHORIZED CHANGES TO AN ELECTRONIC DOCUMENT

(75) Inventors: John M. Boyer, Victoria (CA); Vladimir Trakhtenberg, Nanaimo (CA)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/423,527

(22) Filed: Jun. 12, 2006

(65) Prior Publication Data
US 2007/0288767 A1 Dec. 13, 2007

(51) Int. Cl.
*G06F 21/00* (2006.01)

(52) U.S. Cl.
USPC ............. 726/26; 726/27; 726/28; 726/29; 726/30

(58) Field of Classification Search
USPC ............. 726/24, 27–30; 715/741; 713/194
See application file for complete search history.

(56) References Cited

U.S. PATENT DOCUMENTS

| | | | |
|---|---|---|---|
| 5,577,209 A * | 11/1996 | Boyle et al. | 726/4 |
| 5,758,068 A * | 5/1998 | Brandt et al. | 726/27 |
| 5,787,175 A * | 7/1998 | Carter | 713/165 |
| 5,991,399 A * | 11/1999 | Graunke et al. | 380/279 |
| 6,018,801 A * | 1/2000 | Palage et al. | 726/2 |
| 6,253,326 B1 * | 6/2001 | Lincke et al. | 726/12 |
| 6,449,721 B1 * | 9/2002 | Pensak et al. | 713/171 |
| 6,738,077 B1 | 5/2004 | Wendker et al. | |
| 6,948,133 B2 | 9/2005 | Haley | |
| 7,039,871 B2 | 5/2006 | Cronk | |
| 7,203,966 B2 * | 4/2007 | Abburi et al. | 726/29 |
| 7,406,599 B1 | 7/2008 | Pravetz et al. | |
| 7,430,714 B1 * | 9/2008 | Savitzky et al. | 715/255 |
| 2002/0099938 A1 | 7/2002 | Spitz | |
| 2002/0196268 A1 | 12/2002 | Wolff et al. | |
| 2004/0073511 A1 * | 4/2004 | Beaumont et al. | 705/42 |
| 2004/0168150 A1 * | 8/2004 | Ziv | 717/116 |
| 2005/0060581 A1 * | 3/2005 | Chebolu et al. | 713/201 |
| 2005/0076215 A1 | 4/2005 | Dryer | |
| 2005/0081026 A1 * | 4/2005 | Thornton et al. | 713/156 |
| 2005/0091402 A1 * | 4/2005 | Satagopan et al. | 709/245 |
| 2005/0278793 A1 | 12/2005 | Raley et al. | |

OTHER PUBLICATIONS

Micah Dubinko, Xform essentials, 2003, p. 119.*
State Services Commission, New Zealand E-government Interoperability Framework (NZ e-GIF), pp. 1-96, Mar. 2006.

(Continued)

*Primary Examiner* — Ghazal Shehni
(74) *Attorney, Agent, or Firm* — Edward Choi; Hoffman Warnick LLC

(57) ABSTRACT

The present invention provides a method, system, and program product for preventing unauthorized changes to an electronic document (or a portion thereof). Specifically, under the present invention, an electronic document having a user interface control (UIC) is obtained. It is then determined whether a portion of the electronic document for which the user interaction is being attempted is protected by examining at least one of: a signature status of data associated with the UIC, or an archival status of the UIC. Based on this determination, the user interaction will be denied if it affects at least one of: the data, or a presentation property that affects an interpretation of the data is prevented. A notice indicating the denial of the user interaction can then be communicated to a user/party attempting the user interaction.

20 Claims, 4 Drawing Sheets

(56) References Cited

OTHER PUBLICATIONS

Government of India Communications and Information Technology Department of Information Technology National Informatics Centre, "I F E G Interoperability Framework for E-Governance Technical Standards", Release May 31, 2004, pp. 1-108.
Abelson, Ronald B., "PTO Office Action", U.S. Appl. No. 11/423,485, Notification Date Oct. 13, 2010, 8 pages.
Ellen C. Tran, "Office Action", U.S. Appl. No. 11/423,572, Notification Date: Nov. 12, 2009, 13 pages.
Ellen C. Tran, "Final Office Action", U.S. Appl. No. 11/423,572, Notification Date: Mar. 31, 2010, 12 pages.
Ellen C. Tran, "Notice of Allowance and Fee(s) Due", U.S. Appl. No. 11/423,572, Date Mailed: Sep. 10, 2010, 23 pages.
Tran, U.S. Appl. No. 11/423,572, Notice of Allowance & Fees Due, CA920060043US1, Nov. 8, 2010, 14 pages.
Tran, U.S. Appl. No. 11/423,572, Notice of Allowance & Fees Due, CA920060043US1, Feb. 28, 2011, 5 pages.
Abelson, U.S. Appl. No. 11/423,485, Notice of Allowance & Fees Due, CA920060042US1, Apr. 8, 2011, 6 pages.
Abelson, U.S. Appl. No. 11/423,485, Notice of Allowance & Fees Due, CA920060042US1, Mar. 22, 2011, 7 pages.

* cited by examiner 46
50N

CONTACT INFORMATION

JOHN E. SMITH

NAME

50A → 123 JONES AVENUE

STREET AND NUMBER

| MYTOWN | NY | USA |
| CITY | STATE | COUNTRY |

[X] ACCEPT

50B →

[ ] DECLINE

50C → ( SUBMIT )   ( CANCEL )

FIG. 2

METHOD, SYSTEM, AND PROGRAM PRODUCT FOR PREVENTING UNAUTHORIZED CHANGES TO AN ELECTRONIC DOCUMENT

BACKGROUND OF THE INVENTION

1. Field of the Invention

The present invention generally relates to electronic document protection. Specifically, the present invention relates to a method, system, and program product for preventing unauthorized changes to an electronic document.

2. Related Art

As the capabilities of information technology continue to improve, documents such as contracts are increasingly being negotiated and executed in an electronic environment. One key aspect of electronic document execution involves the use of digital signatures. As convenient as they can be, digital signatures raise a variety of issues specifically where execution by multiple parties is required (e.g., in contracts). These issues range from technology-based issues such as whether the particular language in which the document is provided can support multiple signers) to security-based issues such as whether a portion of the document that is already executed by one party can be protected against unauthorized changes by another party.

One more recent technology used for electronic documents/forms is known as XForms. Specifically, traditional HTML Web forms don't separate the purpose from the presentation of a form. XForms, in contrast, are comprised of separate sections that describe what the form does, and how the form looks. This allows for flexible presentation options, including classic XHTML forms, to be attached to an XML form definition. However, current web form solutions based on XForms do not incorporate digital signatures. Prior approaches fail to address this problem because they do not support partial data signing, and fail to address the interaction of signature information on presentation layer constructs. In addition, prior Extensible Forms Description Language (XFDL) releases that have supported multiple signer scenarios are based on signature filters that operate directly over the presentation layer constructs. To this extent, the signature status of presentation layer constructs was used to determine the signature status of data items/nodes associated with user interface constructs/bindings (UICs). Unfortunately, since this strategy is not data-centric, it causes the unnecessary omission of presentation layer details from the signature, rather than conveniently restricting omission to the actual data items that a user is authorized to change after a first signature is applied. Still yet, this technique fails for hierarchical UICs that contain a template of other form controls to be generated one or more times, or to be conditionally generated.

In addition, many document formats support dynamic behaviors during document rendition using some kind of scripting language, such as JavaScript. However, to be considered as an effective document format for archival and digital signature security purposes, the scripting support must either be disabled or not used. For example, one well known document format disables scripting in order to be an acceptable archival format. A second example occurs when a user attempts to digitally sign a form that includes JavaScript. In this case, the user is treated to a disturbing and serious sounding warning that indicates the signature may be insecure because the form includes JavaScript. Since, the user has no way of knowing whether the form is secure, the only option is to create forms that use no script when you want to use the form in a system that requires digital signatures. One problem with disabling scripting in documents that have archival or security requirements is that the scripting is how such documents provide dynamic behaviors that yield a rich user experience. The problem is acute because some fairly straightforward features require a dynamic document, such as inserting or deleting a row from a purchase order, providing a wizard-like guided interview experience, changing the colors or visibility of user interface controls based on user events or user input, and even presenting information that is the calculated or aggregate result of other user input.

Historically, the Workplace Forms product has attempted to address this problem by virtue of XFDL being an XML format in which the results of all calculations and dynamic changes are stored in the markup so that the document serialization represents a snapshot of not just a forms application but the application state. Having everything recorded in the document XML means that dynamic behaviors can be preserved while still satisfying security and archival requirements. However, the introduction of XForms into XFDL has caused the language to become more like other document formats in the sense that the presentation layer is an ephemeral template whose serialization does not directly reflect dynamic changes made during run time. Instead, with XForms, the only thing that changes during user interaction is the XML data in the model.

In view of the foregoing, there exits a need for a solution that overcomes at least one of the deficiencies in the related art.

SUMMARY OF THE INVENTION

In general, the present invention provides a method, system, and program product for preventing unauthorized changes to an electronic document such as a contract (or a portion thereof). Specifically, under the present invention, an electronic document having a user interface control (UIC) is obtained or otherwise accessed. It is then determined whether a portion of the electronic document for which a user interaction is being attempted is protected by examining at least one of: a signature status of data associated with the UIC, or an archival status of the UIC. Based on this determination, the user interaction will be denied if it affects at least one of: the data, or a presentation property that affects an interpretation of the data. A notice (e.g., ephemeral message, a modeless message, a modal message, etc.) indicating the denial of the user interaction can be communicated to a user/party attempting the user interaction.

A first aspect of the present invention provides a method for preventing unauthorized changes to an electronic document, comprising: accessing an electronic document having a user interface control (UIC); determining whether a portion of the electronic document is protected by examining at least one of: a signature status of data associated with the UIC, or an archival status of the UIC; and preventing, based on the determining, a user interaction with the electronic document that affects at least one of: the data, or a presentation property of the electronic document of the UIC that affects an interpretation of the data.

A second aspect of the present invention provides a system for preventing unauthorized changes to an electronic document, comprising: a system for accessing an electronic document having a user interface control (UIC); a system for determining whether a portion of the electronic document is protected by examining a of: a signature status of data associated with the UIC, or an archival status of the UIC; and a system for preventing, based on the determining, a user interaction with the electronic document that affects a of: the data, or a presentation property of the electronic document that affects an interpretation of the data.

A third aspect of the present invention provides a program product stored on a computer readable medium for preventing unauthorized changes to an electronic document, the computer readable medium comprising program code for causing a computer system to perform the following steps: accessing an electronic document having a user interface control (UIC); determining whether a portion of the electronic document is protected by examining at least one of: a signature status of data associated with the UIC, or an archival status of the UIC; and preventing, based on the determining, a user interaction with the electronic document that affects at least one of: the data, or a presentation property of the electronic document that affects an interpretation of the data.

A fourth aspect of the present invention provides a method for deploying an application for preventing unauthorized changes to an electronic document, comprising: providing a computer infrastructure being operable to: obtain an electronic document having a user interface control (UIC); determine whether a portion of the electronic document is protected by examining at least one of: a signature status of data associated with the UIC, or an archival status of the UIC; and prevent, based on the determining, a user interaction with the electronic document that affects at least one of: the data, or a presentation property of the electronic document that affects an interpretation of the data.

A fifth aspect of the present invention provides a computer software embodied in a propagated signal for preventing unauthorized changes to an electronic document, the propagated signal comprising instructions for causing a computer system to perform the following steps: accessing an electronic document having a user interface control (UIC); determining whether a portion of the electronic document is protected by examining at least one of: a signature status of data associated with the UIC, or an archival status of the UIC; and preventing, based on the determining, a user interaction with the electronic document that affects of the electronic document at least one of: the data, or a presentation property that affects an interpretation of the data.

Therefore, the present invention provides a method, system, and program product for preventing unauthorized changes to an electronic document.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative electronic document having user interface controls (UICs) according to the present invention.

Figure 1:
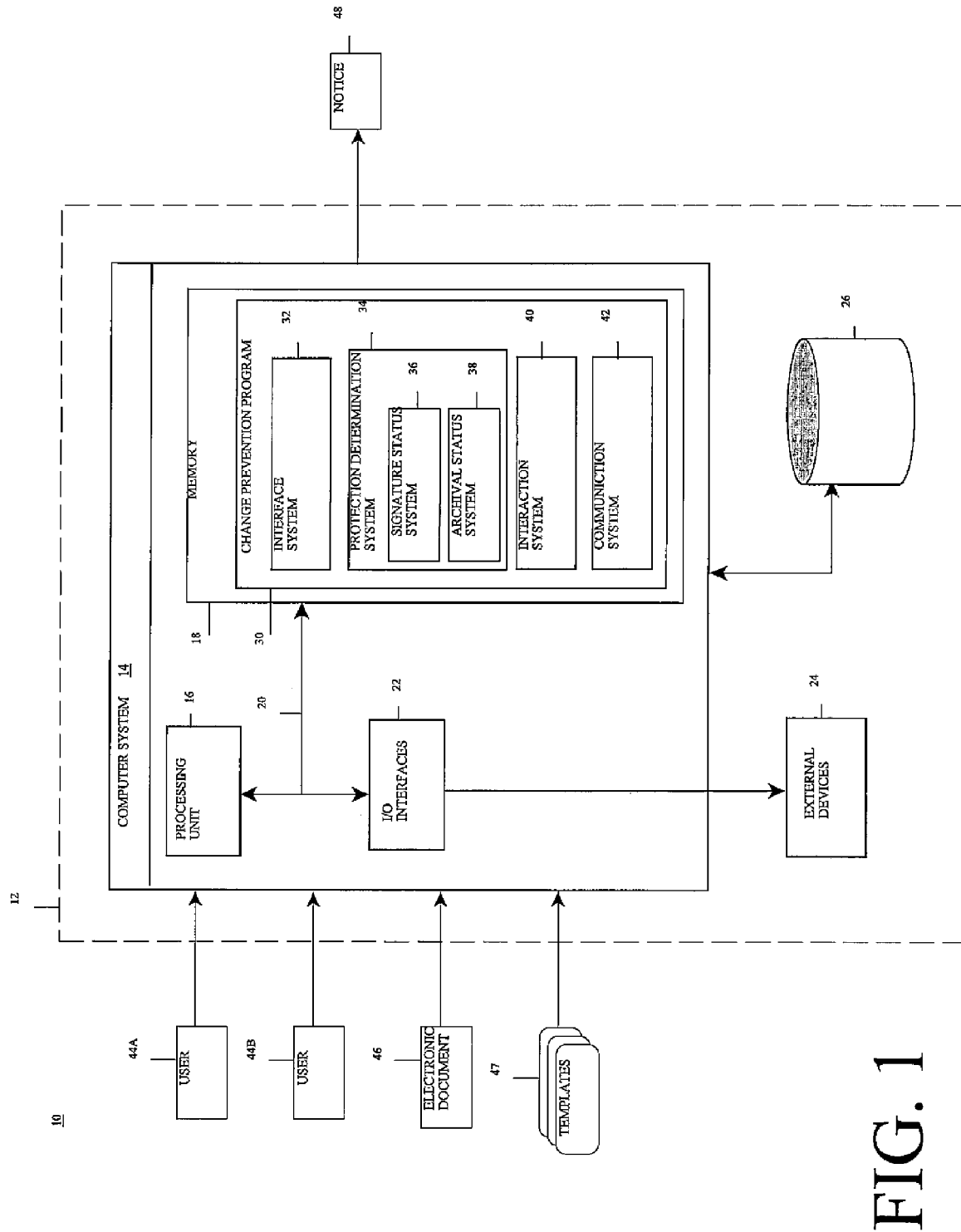
FIG. 1 depicts a system for preventing unauthorized changes to an electronic document according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
  I. General Description
  II. Computerized Implementation
    A. Signature Status
    B. Archival Status I. General Description As indicated above, the present invention provides a method, system, and program product for preventing unauthorized changes to an electronic document such as a contract (or a portion thereof). Specifically, under the present invention, an electronic document having a user interface control (UIC) is obtained or otherwise accessed. It is then determined whether a portion of the electronic document for which a user interaction is being attempted is protected by examining at least one of: a signature status of data associated with the UIC, or an archival status of the UIC. Based on this determination, the user interaction will be denied if it affects at least one of: the data, or a presentation property of the electronic document (e.g., UIC) that affects an interpretation of the data. A notice (e.g., ephemeral message, a modeless message, a modal message, etc.) indicating the denial of the user interaction can be communicated to a user/party attempting the user interaction.

II. Computerized Implementation

Referring now to FIG. 1, a more detailed diagram of a computerized implementation 10 of the present invention is shown. As depicted, implementation 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to implement and/or perform the functions of the present invention for others.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as change prevention system 120, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server.

Similarly, memory 18 and/or storage system 26 can comprise any combination of various types of data storage and/or transmission media that reside at one or more physical locations. Further, I/O interfaces 22 can comprise any system for exchanging information with one or more external interfaces 24. Still further, it is understood that one or more additional components (e.g., system software, math co-processing unit, etc.) not shown in FIG. 1 can be included in computer system 14. However, if computer system 14 comprises a handheld device or the like, it is understood that one or more external interfaces 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is change prevention program 30, which includes an interface system 32, a protection determination system 34, and an interaction system 40, and a communication system 42. In addition, protection determination system 34 includes a signature status system 36, and an archival status system 38. These systems protect electronic document 46 (e.g., a contract) from unauthorized changes. It should be appreciated that although a particular configuration of change prevention program 30 has been depicted, the teachings recited herein could be carried out with a different configuration.

In any event, assume that electronic document 46 is a contract between parties/users 44A-B. Further assume that at least a portion of the contract is protected (e.g., may have been reviewed and executed by user 44A, may have been classified as needing to be archived, etc.). The present invention will prevent a party such as user 44B from making unauthorized changes to such protected portions if they affect signed data, or a presentation property (of electronic document 46) that affects an interpretation of the data.

Specifically, under the present invention, interface system 32 is adapted to receive or otherwise obtain electronic document 46 as well as any presentation layer template(s) 47 therefor. Interface system 32 is also adapted to render electronic document 46 (e.g., using templates 47) for display to users 44A-B. Referring to FIG. 2, electronic document 46 as displayed to users 44A-B is shown in greater detail. As depicted, electronic document 46 (e.g., as displayed) typically includes a set (e.g., at last one) of UICs 50A-N such as field(s) 50A, radio box(es) 50B, button(s) 50C, etc. UICs 50A-N are typically associated with data underlying the actual electronic document 46. Along these lines, a single UIC 50A-N could be associated with a single data item or a group of data items. For example, a name field UIC 50A could be associated with a single data item such as the name "John Smith". Alternatively, a single contact information UIC 50*n* could be associated with multiple data items such as the name "John Smith", the address "123 Jones Avenue", the City "MyTown", the State "New York", and the country "USA".

Regardless, referring back to FIG. 1, assume that when electronic document 46 is rendered, user 44B attempts a "user interaction" with electronic document 46 (e.g., attempts to "click" on a portion of electronic document 46 such as UIC 50B with a pointer device in an attempt to make a change thereto). Under the present invention, protection determination system 34 will determine which portions of electronic document 46 are protected. This determination can be made by signature status system 36 based on a signature status of the data associated with UIC(s) 50A-N with which the interaction is being attempted, or an archival status of UICs with which the interaction is being attempted. These options will be discussed in greater detail below. However, in the case of the former, it could be the case that user 44A has already signed/executed the portion of the agreement that user 44B desires to change. When a portion (of the presentation layer) of electronic document 46 is executed, the signature status of the underlying data will be changed from unsigned to signed. That is, a signature "filter" (e.g., set of rules) is provided under the present invention that indicates the signature/protection status of UIC(s) 50A-N based on signature status of the underlying data. In the case of archival status, UIC(s) 50A-N and associated data of electronic document 46 are periodically archived. The markup that declares each UIC 50A-N appears in the electronic document serialization that could be archived at any time. The UICs 50A-N describe the initial presentation layer appearance, and may contain direct declarations of how the presentation effects can be changed based on changes made to data. These are genreall permissible. However, if the UIC presentation layer is changed after initialization without the change coming from a directly declared expression, then the change is forbidden because the form and hence the UIC could be archived or signed at some point in the future, and it is highly desirable for the markup for UIC to represent the countenance of the UIC. This protection generally applies only to the presentation layer effects of the UIC, not to the data associated with the UIC.

If user 44B attempts to interact with a portion (UIC(s) 50A-N of FIG. 2) of electronic document 46, signature status system 36 could examine whether associated data has been signed. Alternatively or in addition, archival status system 38 could examine whether the UIC 50A-N must be protected for archival purposes. If the answer to either of the two examinations is yes, then that portion of the electronic document 46 is deemed to be protected. In such a case, interaction system 40 would determine whether the attempted user interaction would affect either the signed data itself, and/or a presentation property (e.g., background color, font language, etc.) that affects interpretation of the data. If so, interaction system 40 will deny the user interaction. When a user interaction by a party such as user 44B is denied under the present invention, communication system 42 will communicate and/or otherwise provide (e.g., display) an associated notice, such as an ephemeral message, a modeless message, a modal message, a tooltip, etc. thereto.

A. Signature Status

This section will discuss in greater detail how signature status system 36 will determine whether a portion of electronic document 46 is protected based upon signature status.

In general, generated signatures for Xform-based forms automatically sign an entire presentation layer plus the portion of data indicated by the signature filter (mentioned above). Since the entire presentation layer is signed, the signature status can no longer be determined based on the signed status of the presentation markup. Instead, signature status of a UIC is determined by the signed status of a data item (node) indicated by its UI binding to the model (if it has one that binds to a data node), and by a context data item/node otherwise. This is especially effective, relative to the prior XFDL method, at determining a reasonable signature status for generated form controls, such as those from a repeat, switch or group.

Existing digital signatures are validated on form initialization, and any data items/nodes covered by signatures are marked as signed by each signature that does so. Any signatures created after that point also mark the data items (nodes) that they cover as signed. The present invention thus adds a signature filter (e.g., set of rules) that allows fine-grain control over signing portions of the XML data, facilitating the form author's ability to focus on the data that must be secured and omit only data that must remain mutable after the signature is affixed. The form author is then easily able to sign the entire presentation layer since this only makes the presentation template immutable. Shown below are three illustrative rules in which UIC(s) 50A-N are considered to be protected based on the signature status of associated data.

(i) An XFDL item (UIC) that contains a form control which expresses a UI binding is considered to be signed if and only if the associated data is covered by one or more signatures.

(ii) An XFDL item that contains a form control in which a UI binding evaluates to nothing or in which the UI binding is not expressed is considered to be signed if and only if the context data/node for the control is signed. Alternatively, an XFDL item can be deemed unsigned if it does not bind to a data item (node). However, hierarchic constructs such as xforms:group and xforms:switch often do not express a binding, so they would be considered unsigned, but they could contain controls with expressed UI bindings to signed data items (nodes). XFDL forbids the overlap of signed and unsigned items due to potential visual interaction that could affect interpretation of the signed data.

(iii) An XFDL item that is generated from within a hierarchic grouping construct (e.g. xforms:repeat, xforms:switch or xforms:group) but which does not contain a form control capable of binding to the XML data model is deemed to be signed if and only if the context data node is signed.

Collectively, the latter two could be considered as the data being a data item associated with the user interface grouping UIC that contains the UIC, whether due to the UIC not binding directly to a data item or due to the inability by design of the UIC to bind directly to a data item.

In any event, this method includes forbidding a party such as user 44B from entering input into the UIC, since this would change signed data once the input traveled through the UI binding. If data associated with UIC is deemed signed, interaction system 40 will then determine whether the user interaction will affect such data. If so, the user interaction will be denied, and a notice indicating the same will be communicated by communication system 42. The method includes reporting to the user that the item is signed when the user performs a UI gesture at the UIC (e.g., they are presented with a notice telling them that the item is signed when they point at it with a pointer device).

One exception can be that a special kind of XFDL signature (known as an overriding signature) does allow changes to signed data based on an established precedence of signature validation. However, the user 44B is still told that the UIC is mapped to a signed data item (node) even if the signature allows modification of the signed data item (node). A second exception is that a signature button that is in a grouping control falls under rule (iii) above, in which case it only reports itself signed if the context node is signed by some signature other than the one that is created by a signature button.

The present invention also extends the behavior of the xforms:switch, which is the XForms construct used to vary the user interface so the user can "switch" between views of different parts of a larger document. Under the present invention, an xfdl:state attribute was added that allows the current case selected by the switch to appear in the data serialization. This is important to archival documents since the last known state can be easily reproduced any time the document is loaded, but in terms of the security play, once the node containing the state is signed, the data can no longer be modified. This is how the presentation layer restriction of not allowing the switch to change cases can be implemented. That is, the switching of UI states is prevented once the UI is in a signed context.

It should be appreciated that some pieces UI must remain switchable after signatures are affixed, so the present invention also includes a method for indicating whether a piece of UI must remain switchable after affixing signatures. The method includes allowing a UI switch to continue to operate after a signature protects it the switch does not have an xfdl:state. Even after the whole form is signed, it is still desirable to be able to navigate to all of the panels.

Figure 3:
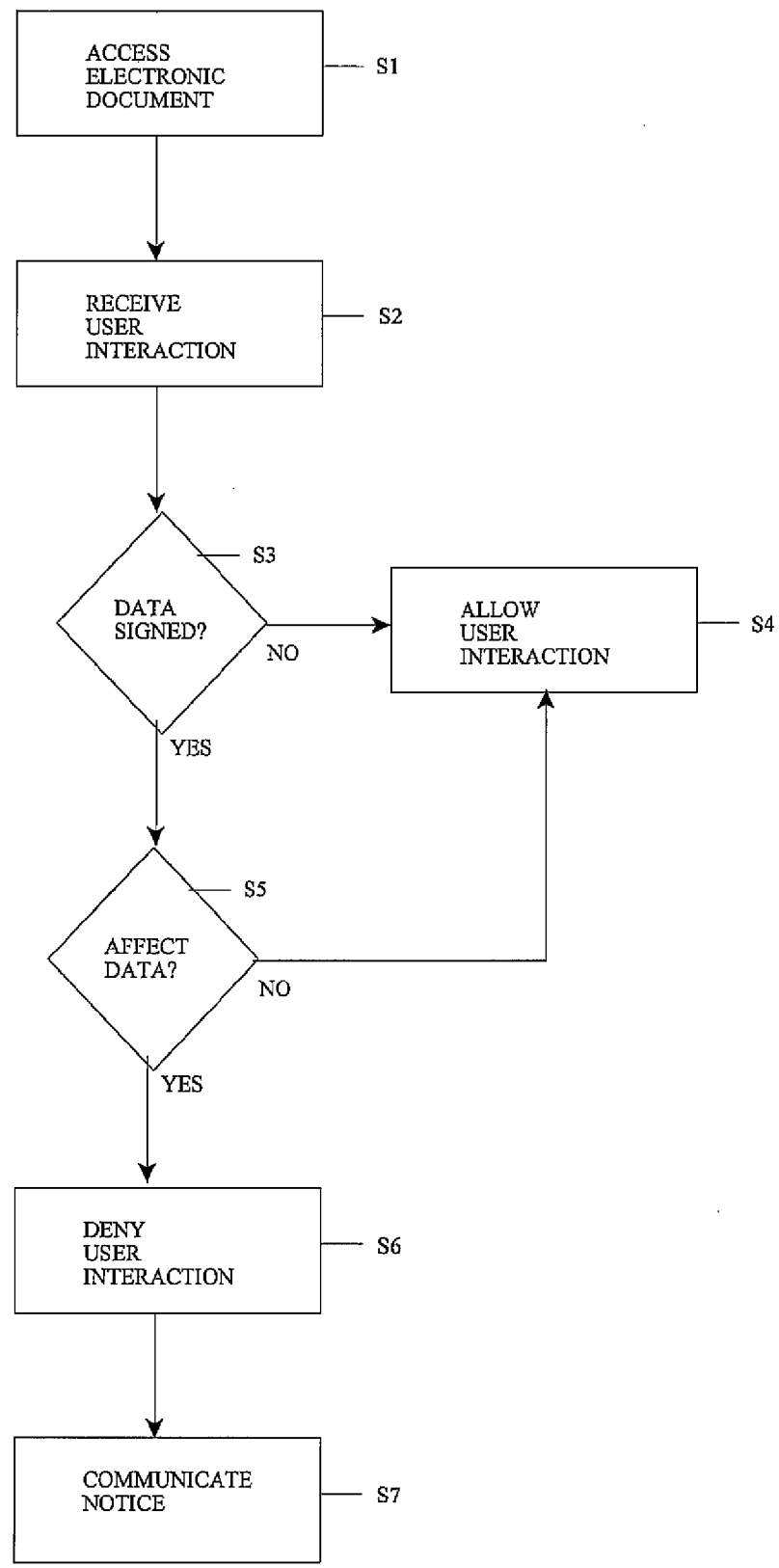
FIG. 3 depicts a first method flow diagram according to the present invention.

Referring to FIG. 3, a method flow diagram incorporating the signature status methodology of the present invention is shown. In step S1, an electronic document having one or more UICs is accessed. In step S2, an attempted user interaction with a portion of the electronic document (via one of UICs) is received. In step S3, it is determined whether data for with that portion is protected by examining a signature status data associated with the UIC. If the data is not signed, the user interaction is allowed in step S4. If not, it will be determined in step S5 whether the user interaction affects the signed/protected data. If not, the user interaction would be allowed in step S4. If, however, the user interaction would affect the signed/protected data, the user interaction would be denied in step S6, and a corresponding notice would be communicated in step S7.

B. Archival Status

This section will discuss in greater detail how archive status system 38 (FIG. 1) will determine whether a UIC 50A-N (FIG. 2) must be protected for archival purposes. This approach addresses the problem of how to let a document format retain dynamic user interface behaviors yet still be an acceptable format for archival and security purposes when the only changes to the document that affect serialization are made in the data layer. This is an important requirement that document engineers have not solved (e.g., they either remove the dynamic functionality or the expectation of security (even when they still apply the digital signatures)).

The method separates the dynamic behavior functionality into three classes: (1) dynamic effects (presentation properties) that can be reconstructed given the presentation layer template 47 (FIG. 1) and the data changes recorded in the document serialization; (2) dynamic effects (presentation properties) that are an ephemeral part of the usability of electronic document 46 and do not affect its Security; and (3) dynamic effects (presentation properties) that change the interpretation of electronic document 46 but have no effect on electronic document 46's serialization. The method implemented by interaction system 40 disables the third kind of dynamic effect in the language when archival status system 38 determines that a UIC, with which a user interaction is being attempted, must be protected for archival purposes. Since dynamic effects are still achievable within the document format by the first two methods, document authors are able to achieve dynamic effects and meet archival/security requirements simultaneously.

In particular, archival status system 38 detects UICs in which change must be restricted by determining whether they are generated by XForms constructs because changes to such items are not recorded in the document serialization. Along these lines, XFDL items not associated with XForms still have their changes recorded in their serializations for backward compatibility. However, association with XForms is only how the presentation implementation of the invention detects that these UICs should be protected for archival purposes.

The functions set( ), duplicate( ) and destroy( ) in the XFDL language are the principal means by which form authors could make dynamic changes to the document content. These functions are forbidden to operate over the XForms-associated XFDL items. Other languages will have their own set of functions and scripting constructs for making dynamic changes.

Dynamic behaviors in XFDL can also occur by attaching a "compute" expression directly to an element representing a UI presentation property/attribute. Two examples are shown here:

```
<fontcolor compute="value > '10000' ? 'red' : 'black'"/>
<bgcolor compute="mouseover=='on' ? 'lightblue' : 'blue'"/>
```

The first is an example of case #1 above. Namely, the font color is dynamically changing between red and black based on some condition, but the condition is associated with another property of the item, value in this case. From the definition of the language, it can be ascertained that the value property is directly associated with XML data from the model by the UI binding. Hence, this type of direct compute expression is permitted to operate because the state of the UI property font color can be derived from a sequence of steps that leads back to the XML data that does appear in the document serialization. It turns out that the sequence of steps between the computed property and the underlying data is allowed to be arbitrarily long.

Under the present implementation of the invention, the dependency path leading back to data is implemented mostly by the XFDL computation dependency system, followed by the single step from a value property through the UI binding to the data. However, protection determination system 34 (e.g., archival status system 34) could also analyze imperative code (e.g., pure JavaScript) for computational dependencies leading back to serialized data. If all statements in a block of JavaScript can be traced back to dependencies only on serialized data and not ad hoc run-time data structures and local variables, then the code could be allowed to run The second example of the compute on bgcolor is an example of case #2 set forth above. It changes the background color of something based on whether or not the mouse cursor is pointing at the UIC. This is an example of a simple visual effect that is only dependent on an ephemeral event that occurs at run-time. Hence the mark-up includes an expression that accurately characterizes a semantic that is within the common domain of user experience. In general, XFDL properties in XForms-associated items cannot be affected by means other than an attached compute expression, and the compute expression only operates in response to mouse change, focus change and activation user events and changes of state that can be analytically traced back to data changes.

The inclusion of XForms into XFDL has introduced a second class of script-like operations into the language called XForms actions. Some actions refer to operations already known to be acceptable in archival/security contexts, such as focus change, toggling the user interface to view parts of a full document, or some kinds of submission. Other operations are permissible in archival/security contexts because they operate over the XML data. Hence XForms actions are generally allowed to operate because they do not perform the offensive actions that cause script to be deemed unsafe for archival/security purposes.

An additional aspect of this methodology is that it distinguishes the archival needs from those of security. The activation of a UIC such as a button may cause the execution of XForms actions such as setvalue, insert or delete, which can change data. However, if the button is deemed to be signed (by signature status system 36), then its actions are not allowed to occur.

Figure 4:
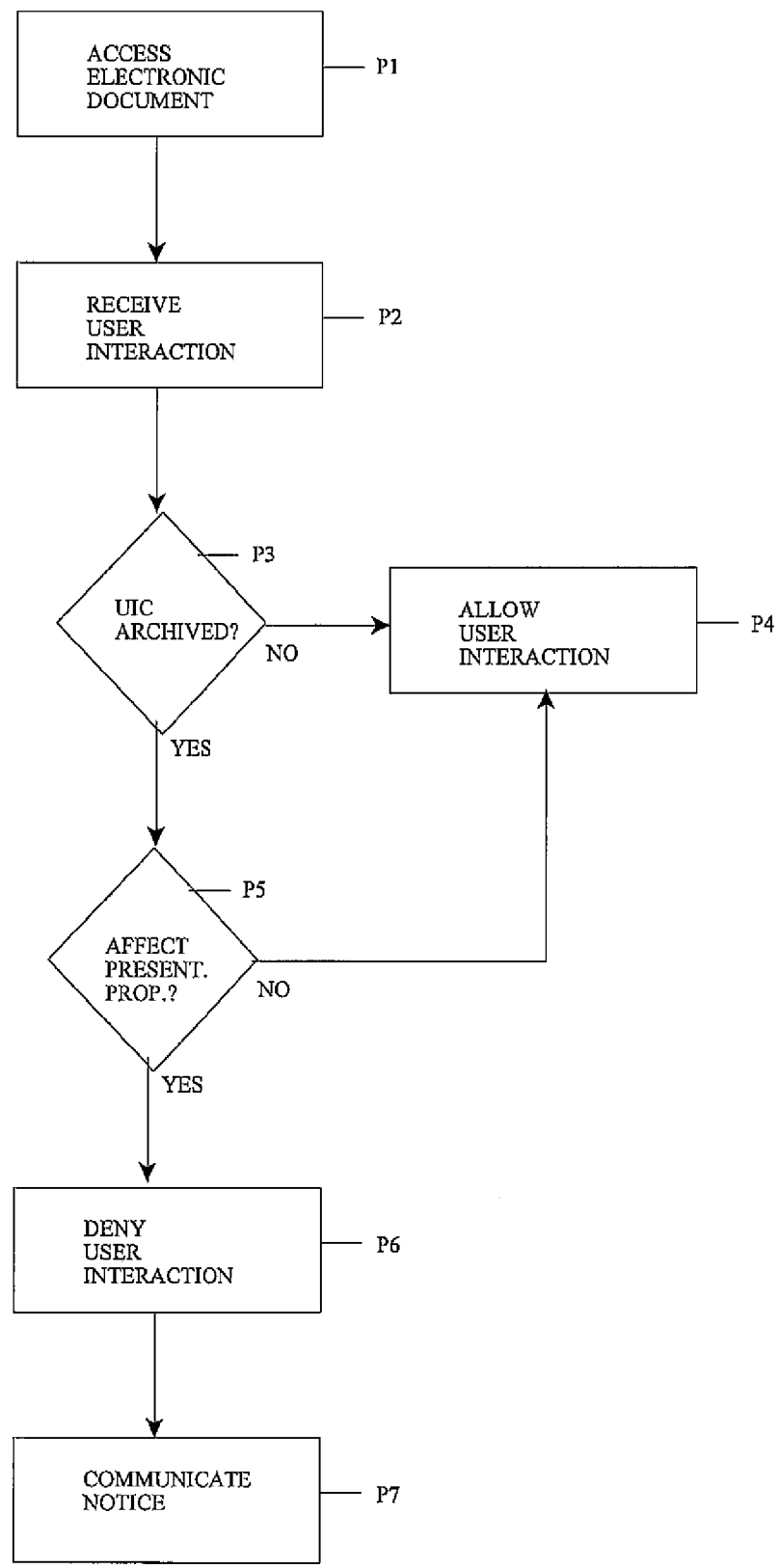
FIG. 4 depicts a second method flow diagram according to the present invention.

Referring to FIG. 4, a method flow diagram incorporating the archival status methodology of the present invention is shown. In step P1, an electronic document having one or more UICs is accessed. In step P2, an attempted user interaction with a portion of the electronic document (via one of UICs) is received. In step P3, it is determined whether that portion is protected by examining an archival status of the UIC. If the UIC is not archived, the user interaction is allowed in step P4. If the UIC is archived, it will be determined in step P5 whether the attempted user interaction affects a presentation property (of the electronic document) that affects an interpretation of the signed/protected data. If not, the user interaction would be allowed in step P4. If, however, the user interaction would affect a presentation property that affects the interpretation of the signed/protected data signed/protected data, the user interaction would be denied in step P6, and a corresponding notice would be communicated in step P7.

While shown and described herein as a method and system for preventing unauthorized changes to an electronic document, it is understood that the invention further provides various alternative embodiments. For example, in one embodiment, the invention provides a computer-readable/useable medium that includes computer program code to enable a computer infrastructure to prevent unauthorized changes to an electronic document. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to prevent unauthorized changes to an electronic document. In this case, the service provider can create, deploy, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for preventing unauthorized changes to an electronic document. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for preventing unauthorized changes to an electronic document, comprising:
   accessing, via a computer device, the electronic document having a user interface control (UIC), the UIC being integrated into the electronic document;
   determining, via the computer device, whether a portion of the electronic document is protected by examining at least one of: a signature status of data in the electronic document associated with the UIC, or an archival status of the UIC, wherein the determining is in response to an attempted user interaction with the portion of the electronic document; and
   preventing, via the computer device, based on the determination that the portion of the electronic document is at least one of signed or archived, all user interaction with the signed or archived portion of the electronic document that affects at least one of: the data, or a presentation property of the electronic document that affects an interpretation of the data, wherein the data comprises a data item directly associated with the UIC.

2. The method of claim 1, further comprising communicating a notice indicating the preventing to a user attempting the user interaction.

3. The method of claim 2, wherein the notice is selected from a group consisting: of an ephemeral message, a modeless message, and a modal message.

4. The method of claim 1, wherein the data comprises a data item associated with a user interface grouping UIC that contains the UIC.

5. The method of claim 1, wherein the electronic document comprises a contract, and wherein the signature status pertains to a signature by at least one party to the contract.

6. A system for preventing unauthorized changes to an electronic document, comprising:
   at least one computer device, having:
   a system for accessing the electronic document having a user interface control (UIC), the UIC being integrated into the electronic document;
   a system for determining whether a portion of the electronic document is protected by examining at least one of: a signature status of data in the electronic document associated with the UIC, or an archival status of the UIC, wherein the determining is in response to an attempted user interaction with the portion of the electronic document; and
   a system for preventing, based on the determination that the portion of the electronic document is at least one of signed or archived, all user interaction with the signed or archived portion of the electronic document that affects at least one of: the data, or a presentation property of the electronic document that affects an interpretation of the data, wherein the data comprises a data item directly associated with the UIC.

7. The system of claim 6, further comprising a system for communicating a notice indicating the preventing to a user attempting the user interaction.

8. The system of claim 7, wherein the notice is selected from a group consisting of an ephemeral message, a modeless message, and a modal message.

9. The system of claim 6, wherein the data comprises a data item associated with a user interface grouping UIC that contains the UIC.

10. The system of claim 6, wherein the electronic document comprises a contract, and wherein the signature status pertains to a signature by at least one party to the contract.

11. A program product stored on a non-transitory computer readable storage medium for preventing unauthorized changes to an electronic document, the computer readable medium comprising program code for causing a computer system to perform the following steps:
   accessing the electronic document having a user interface control (UIC), the UIC being integrated into the electronic document;

determining whether a portion of the electronic document is protected by examining at least one of: a signature status of data in the electronic document associated with the UIC, or an archival status of the UIC, wherein the determining is in response to an attempted user interaction with the portion of the electronic document; and preventing, based on the determination that the portion of the electronic document is at least one of signed or archived, all user interaction with the signed or archived portion of the electronic document that affects at least one of: the data, or a presentation property of the electronic document that affects an interpretation of the data, wherein the data comprises a data item directly associated with the UIC.

12. The program product of claim 11, further comprising program code for causing the computer system to perform the following step: communicating a notice indicating the preventing to a user attempting the user interaction.

13. The program product of claim 12, wherein the notice is selected from a group consisting of an ephemeral message, a modeless message, and a modal message.

14. The program product of claim 11, wherein the data comprises a data item associated with a user interface grouping UIC that contains the UIC.

15. The program product of claim 11, wherein the electronic document comprises a contract, and wherein the signature status pertains to a signature by at least one party to the contract.

16. A method for deploying an application for preventing unauthorized changes to an electronic document, comprising:
providing a computer infrastructure configured to:
access the electronic document having at least one user interface control (UIC), the UIC being integrated into the electronic document;

determine whether a portion of the electronic document is protected by examining at least one of: a signature status of data in the electronic document associated with the UIC, or an archival status of the UIC, wherein the determination is in response to an attempted user interaction with the portion of the electronic document; and prevent, based on the determination that the portion of the electronic document is at least one of signed or archived, all user interaction with the signed or archived portion of the electronic document that affects at least one of: the data, or a presentation property of the electronic document that affects an interpretation of the data, wherein the data comprises a data item directly associated with the UIC.

17. The method of claim 16, wherein the computer infrastructure is further configured to communicate a notice indicating the preventing to a user attempting the user interaction.

18. The method of claim 17, wherein the notice is selected from a group consisting of an ephemeral message, a modeless message, and a modal message.

19. The method of claim 16, wherein the data comprises a data item associated with a user interface grouping UIC that contains the UIC.

20. The method of claim 16, wherein the electronic document comprises a contract, and wherein the signature status pertains to a signature by at least one party to the contract.

\* \* \* \* \*